United States Patent
Titus et al.

(10) Patent No.: US 11,816,143 B2
(45) Date of Patent: Nov. 14, 2023

(54) INTEGRATED IMAGE SYSTEM BASED ON IMAGE SEARCH FEATURE

(71) Applicant: eBay Inc., San Jose, CA (US)

(72) Inventors: Mary Adaway Titus, San Jose, CA (US); Hyuntae Kim, Moutain View, CA (US); Benjamin Eliot Klein, San Jose, CA (US); Bo Li, San Jose, CA (US); Maxim Manco, San Jose, CA (US); Stephen Anthony Neola, San Jose, CA (US); Andrew Daniel Shea, San Jose, CA (US)

(73) Assignee: eBAY INC., San Jose, CA (US)

(*) Notice: Subject to any disclaimer, the term of this patent is extended or adjusted under 35 U.S.C. 154(b) by 1 day.

(21) Appl. No.: 15/887,667

(22) Filed: Feb. 2, 2018

(65) Prior Publication Data

US 2019/0026316 A1    Jan. 24, 2019

Related U.S. Application Data

(60) Provisional application No. 62/534,025, filed on Jul. 18, 2017.

(51) Int. Cl.
*G06F 16/532* (2019.01)
*G06F 16/732* (2019.01)
(Continued)

(52) U.S. Cl.
CPC .......... *G06F 16/532* (2019.01); *G06F 3/0483* (2013.01); *G06F 3/0486* (2013.01);
(Continued)

(58) Field of Classification Search
CPC ............. G06F 16/9558; G06F 3/04817; G06F 3/0483; G06F 3/04845; G06F 3/0486;
(Continued)

(56) References Cited

U.S. PATENT DOCUMENTS 6,591,295 B1 *   7/2003   Diamond .............. G06F 16/972
                                                          707/999.102
8,038,060 B2    10/2011   Tani et al.
                       (Continued)

FOREIGN PATENT DOCUMENTS

CN         104346037 A      2/2015
WO      2015/153925 A1     10/2015
                       (Continued)

OTHER PUBLICATIONS

Dallas Thomas, "Use Google's Reverse Image Search on Your Android Device," Feb. 10, 2017 (Year: 2017).*
(Continued)

*Primary Examiner* — Yu Zhao
(74) *Attorney, Agent, or Firm* — Shook, Hardy & Bacon L.L.P.

(57) ABSTRACT

In various embodiments, methods and systems for implementing an integrated image search system are provided. The integrated image search system supports an image search feature of a content application on a mobile device. An image identifier is received to execute an image search operation. The image identifier is received via a native operating system action that is customized to support the image search feature. The native operating system action defines an entry point to the image search feature. The entry points can be based on image identifiers identified from a share image action, a share Uniform Resource Locator (URL) action, a copy share URL action, or a drag and drop action. An image of the image identifier is used to execute the image search operation to identify image search results. An image search results page having one or more images search results is caused to be displayed.

20 Claims, 8 Drawing Sheets

(51) Int. Cl.
| | |
|---|---|
| *G06F 16/50* | (2019.01) |
| *G06F 16/955* | (2019.01) |
| *G06F 3/04817* | (2022.01) |
| *G06F 3/0483* | (2013.01) |
| *G06F 3/04845* | (2022.01) |
| *G06F 3/0486* | (2013.01) |
| *H04L 67/02* | (2022.01) |

(52) U.S. Cl.
CPC ...... *G06F 3/04817* (2013.01); *G06F 3/04845* (2013.01); *G06F 16/50* (2019.01); *G06F 16/7335* (2019.01); *G06F 16/9558* (2019.01); *H04L 67/02* (2013.01)

(58) Field of Classification Search
CPC .... G06F 16/7335; G06F 16/27; G06F 16/248; G06F 16/26; G06F 16/957; G06F 16/285; G06F 16/94; G06F 16/972; G06F 16/904; G06F 16/951; G06F 16/9566; G06F 16/20; G06F 16/958; G06F 16/24575; G06F 16/40; G06F 16/44; G06F 16/1794; G06F 16/93; G06F 16/50–587; H04L 67/02
See application file for complete search history.

(56) References Cited

U.S. PATENT DOCUMENTS

| | | | |
|---|---|---|---|
| 8,117,554 B1* | 2/2012 | Grechishkin | G06F 3/04817 715/764 |
| 8,392,842 B1* | 3/2013 | Lorenz | G06T 3/4038 715/767 |
| 8,861,865 B2 | 10/2014 | Jeong et al. | |
| 9,588,991 B2 | 3/2017 | Cevahir et al. | |
| 10,296,641 B2* | 5/2019 | Sogani | G06Q 30/0251 |
| 10,346,546 B2* | 7/2019 | Tetreault | G06F 40/151 |
| 10,616,148 B2* | 4/2020 | Akbulut | G06N 5/041 |
| 10,866,931 B2* | 12/2020 | Lee | G06F 16/178 |
| 2005/0172018 A1* | 8/2005 | Devine | G06F 21/00 709/223 |
| 2007/0133947 A1 | 6/2007 | Armitage et al. | |
| 2009/0199093 A1 | 8/2009 | Chakravarty | |
| 2012/0284247 A1* | 11/2012 | Jiang | G06F 16/9535 707/706 |
| 2013/0124303 A1 | 5/2013 | Kassem | |
| 2014/0095463 A1 | 4/2014 | Pappas | |
| 2015/0046848 A1 | 2/2015 | Vohra et al. | |
| 2015/0046860 A1* | 2/2015 | Sutou | G06F 3/0486 715/769 |
| 2016/0189316 A1* | 6/2016 | Lenahan | G06Q 30/0613 705/26.41 |
| 2017/0004632 A1 | 1/2017 | Chittar et al. | |
| 2019/0124021 A1* | 4/2019 | DeMattei | H04L 51/04 |

FOREIGN PATENT DOCUMENTS

| | | |
|---|---|---|
| WO | 2016/201324 A1 | 12/2016 |
| WO | 2019/018459 A1 | 1/2019 |

OTHER PUBLICATIONS

International Search Report for PCT Application No. PCT/US2018/042579, dated Oct. 9, 2018, 6 pages.
International Written Opinion for PCT Application No. PCT/US2018/042579, dated Oct. 9, 2018, 10 pages.
Communication Pursuant to Article 94(3) EPC Received for European Patent Application No. 18749997.5, dated Mar. 10, 2021, 6 Pages.
Notice Of Allowance Received for Korean Patent Application No. 10-2020-7004655, dated Mar. 25, 2022, 4 Pages.
Summons To Attend Oral Proceeding Received for European Patent Application No. 18749997.5, dated Apr. 13, 2022, 2 Pages.
Summons To Attend Oral Proceeding Received for European Patent Application No. 18749997.5, dated Mar. 31, 2022, 9 Pages.
Pinnington,"Google's Amazing New Search by Image Functionality", retrieved from the Internet URL: <https://tips.slaw.ca/2011/technology/googles-amazing-newsearch-by-image-functionality/>, Oct. 4, 2022, pp. 1-2.
Office Action received for Korean Patent Application No. 10-2020-7004655 dated Oct. 26, 2021, 15 pages.(1 Page of English Translation & 14 pages of Official Copy).
EPO Written Decision To Refuse received for European Patent Application No. 18749997.5, dated Dec. 9, 2022, 17 Pages.
Office Action Received for Korean Patent Application No. 10-2022-7020493, dated Feb. 15, 2023, 9 pages (1 page of english translation & 8 pages of official copy).
Office Action received for Chinese Patent Application No. 201880048347.X, dated Mar. 29, 2023, 19 Pages.
International Preliminary Report on Patentability received for PCT Application No. PCT/US2018/042579, dated Jan. 30, 2020, 10 Pages.
Final Office Action received for Korean Patent Application No. Oct. 2022-7020493, dated Aug. 21, 2023, 6 pages (1 Page of English Translation & 5 Pages of Official Copy).
Decision of Rejection Received for Chinese Patent Application no. 201880048347.X, dated Jun. 22, 2023, 11 pages (2 pages of english translation & 9 pages of official copy).

* cited by examiner

INTEGRATED IMAGE SYSTEM BASED ON IMAGE SEARCH FEATURE

CROSS-REFERENCE TO RELATED APPLICATIONS

This application claims priority to U.S. Provisional Patent Application No. 62/534,025, filed Jul. 18, 2017, and entitled "Integrated Image Search System," the entire contents of which is incorporated herein by reference in its entirety.

BACKGROUND

Users often research and discover products online using different types of web pages and applications. Webpages can include, for instance, blogs and social media websites, and applications can include, for instance, messaging applications and multimedia mobile applications. In particular, on these web pages and applications, users can identify different products based on images of the products. After seeing an image of a product online, a user may want to purchase the product. However, with current content listing tools, it can be challenging to go from a context of viewing an image of a product to a context of being able to buy the product.

SUMMARY

Embodiments of the present invention provide methods and systems for implementing an integrated image search system. An integrated image search system supports an image search feature of a content application on a mobile device. The content application includes the image search feature that operates based in part on the integration of the image search feature with a native operating system of the mobile device. The native operating system can include application programming interfaces that are used to build integrated custom actions that operate as entry points to the image search feature.

In operation, an image identifier is received to execute an image search operation. The image identifier is received via a native operating system action that is customized to support the image search feature of the content application. The native operating system action is an integrated custom action that defines an entry point to the image search feature of the content application. Integrated custom actions that define entry points can include any of the following: a share image action of the native operating system that allows sharing an image to execute the image search, a share URL action of the native operating system that allows sharing a Uniform Resource Location (URL) to execute the image search, a copy share URL action of the native operating system that is used in combination with a clipboard manager, where the clipboard manager is queried to identify an image to execute the image search, and a drag and drop action of the native operating system that is used to identify an image to execute the image search. The content application communicates with a content platform to execute the image search to identify image search results based on an image corresponding to the image identifier. An image search results page having one or more image search results is caused to be displayed.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter

BRIEF DESCRIPTION OF THE DRAWINGS

The present invention is described in detail below with reference to the attached drawing figures, wherein.

DETAILED DESCRIPTION

Figure 1:
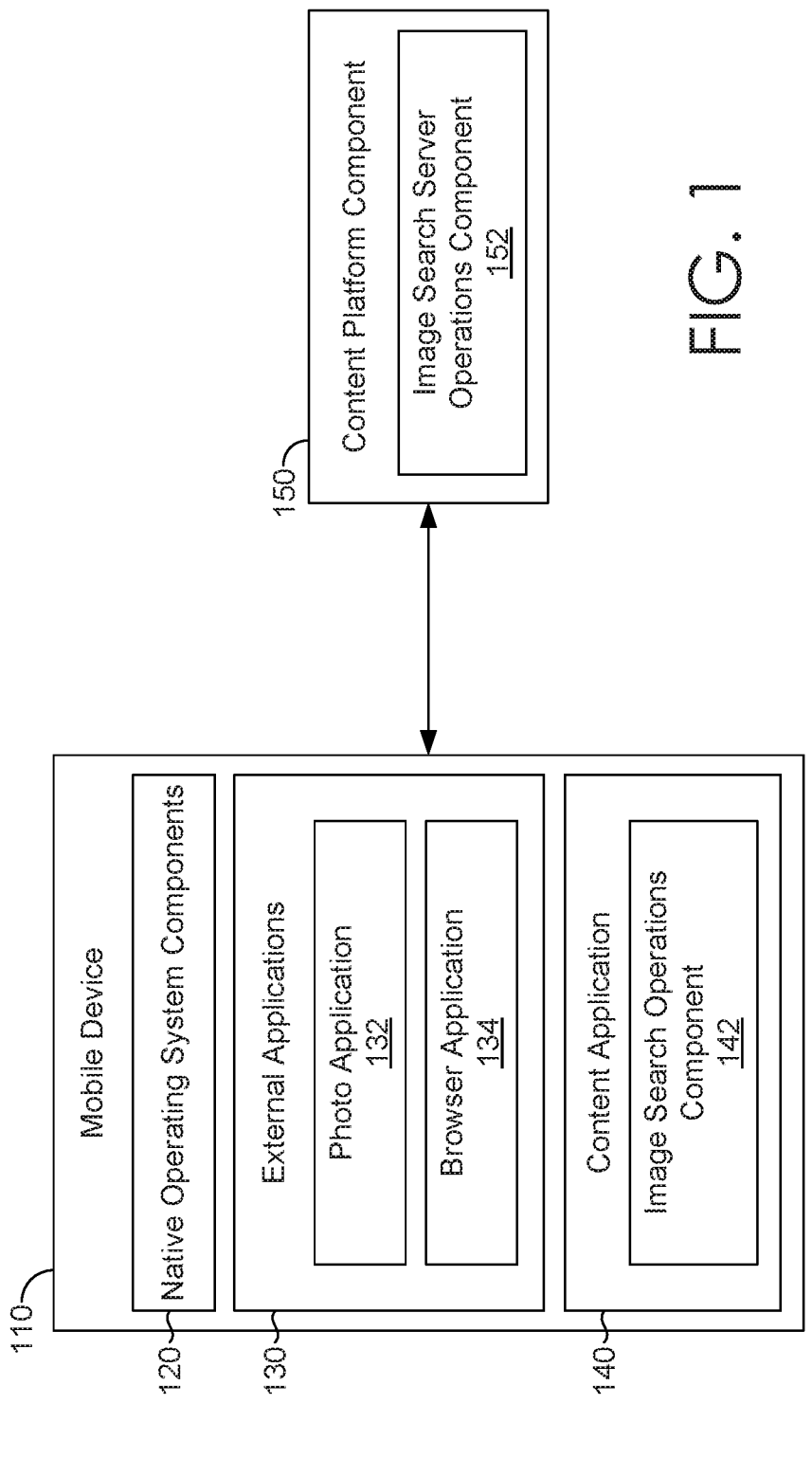
FIG. 1 is a block diagram of an exemplary integrated image search system in which embodiments described herein may be employed.

Users often randomly find product images online, through web pages and applications, for products which they would like to buy. However, with current content applications and services, it can be challenging to go from a web page or application context of viewing an image of a product to a context of being able to buy the product. For example, a user who finds an image of a product on a blog website will have to leave the blog website context and then navigate to a content site to try to find the product. Often times, the user has to use a text-based search in order to find and buy the product. Further, the user may have to go through multiple steps to search for a product based on the image, including, saving the image (e.g., a screenshot or saving the raw image), opening a content website, uploading the image and running an image search to identify the product in the content website product catalog. A seamless user buying experience would allow a user to find an image of a product they are interested in, and from any application, perform an image search through a content site in an integrated way. The user may then buy the product through the content site. As such, a comprehensive system that simplifies identifying products in a content product catalog, by way of an image search that can be effortlessly triggered, would improve the user online buying experience.

Embodiments of the present invention provide simple and efficient methods, and systems, for implementing an integrated image search system. At a high level, a content application on a mobile device includes an image search feature that operates based in part on the integration of the image search feature with a native operating system of the mobile device. The native operating system can include application programming interfaces that are used to build integrated custom actions that operate as entry points to the image search feature. In this regard, the image search feature can be launched from external applications on the mobile device. The image search feature is executed based on inputs and commands received at the content application from an active external application, through the native operating system.

In operation, an image identifier can be identified based on a native operating system integrated custom action interface that is customized and accessed to support performing image search operations on the content application. An image identifier, as used herein, can refer to an image file, image filename, a URL link, or any other name or locator information associated with identity information of a corresponding image. A native operating system action (e.g., share image, share URL, copy share URL, and drag and drop) is customized such that the action operates with the content application to launch and execute the image search feature. The different types of integrated customized actions operate as entry points to the content application for executing the image search feature. An entry point can generally refer to a trigger that transfers processing control of a mobile device between mobile device components. In this regard, entry points support transferring control to the image search feature of the content application using a variety of techniques.

In a first entry point, a share image action of the native operating system includes a share image to execute image search option that can be selected to run an image search for an identified image. For example, a user browsing through a photo application on their phone can choose to identify and share, from the photo application, an image. The image is shared with the content application in order to perform an image search operation.

In a second entry point, a share URL action of the native operating system includes a share URL to execute an image search option that can be selected to run an image search for an image corresponding to the URL. For example, a user browsing a web site can identify and share a URL from the website. The URL is shared with the content application in order to perform an image search operation. In one exemplary implementation, an extract thumbnail service can be used to extract a thumbnail representation of the image or the image based on the URL. For example, the open graph protocol supports open graph image tags that can be used to extract a thumbnail of the image. The extracted thumbnail representation of the image or the image can be used to perform an image search operation on the content application.

In a third entry point, a copy share URL action of the native operating system is used in combination with a clipboard manager, where the clipboard manager is queried to identify an image to execute the image search. The content application queries the clipboard to identify an image identifier stored in a clipboard store of the clipboard. For example, when a user opens the content application, the content application can identify an image on the clipboard and generate an image search prompt asking the user if the user would like to run an image search operation.

In a fourth entry point, a drag and drop action of the native operating system can be used to identify an image dragged and dropped to execute an image search. The content application recognizes the drag and drop action and then performs the image search using the image that was identified using the drag and drop pointing gesture. For example, a user in a photo application or a website can simply drag the image from the photo application or website and then drop the image into the content application, which then triggers running an image search operation.

In some embodiments, the image search feature includes a graphics editor tool for editing the image. The graphics editor tool can be triggered after an image identifier has been received and a representation of the image is available. The graphics editor tool can be launched in the content application using an extension to an external application (e.g., camera or photo interface). For example, after a user elects to start an image search, the image is loaded into the graphics editor tool with a cropper prompt that prompts the user to crop the image.

Furthermore, the image is used to execute the image search operation through the content application to identify image search results for the image. In particular, the image is used to search a product catalog of a content platform of the content application. The image identifier or image is communicated to the content platform and image search results are received from the content platform. Image search results for the image search are provided on an image search results page. The image search results page can be within the content application (i.e., an in-app search results page) or the search results can be communicated and displayed through an interface of an external application (i.e., out-of-app search results page).

The in-app search results page can also be associated with additional functionality that supports image searching features. In particular, the search results page can be displayed with a link that serves as an entry point to an external application. For example, the search results page can be displayed in combination with a thumbnail image inside of the search input bar that operates as an entry point to a related external application (e.g., camera application, photo application or browser application).

Advantageously, the image search feature improves the operation of the mobile device because the entry points to the image search feature are seamlessly integrated into the native operating system. The integrated custom actions that define entry points are wholly integrated with the native operating system based on customizations made using native operating system APIs. In this regard, the integrated image search system is not simply a plug-in or an extension that has to register with a host application or access shared libraries, which can be cumbersome and also have other shortcomings. With embodiments described herein, communications between the mobile device components is more efficient as the different components interoperate to share an image identifier from external applications to the content application for the image search feature. Moreover, the user experience is improved as the user need not go through multiple manual steps to search for a product catalog based on an image found on an external application. Embodiments of the present disclosure are further described below with reference to exemplary system components.

With reference to FIG. 1, FIG. 1 illustrates an exemplary integrated image search system 100 in which implementations of the present disclosure may be employed. In particular, FIG. 1 shows a high level architecture of integrated image search system 100 having components in accordance with implementations of the present disclosure. It should be understood that this and other arrangements described herein are set forth only as examples. In addition, a system, as used herein, refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. For example, although discussed for clarity as the content application component, operations discussed can be performed in a distributed manner. The system may be formed from other systems and components thereof. It should be understood that this and other arrangements described herein are set forth only as examples.

Among other components not shown, integrated image search system 100 includes a mobile device 110 having native operating system components 120, external applications 130 (e.g., photo application 132 and browser application 134), and a content application 140 having an image search operations component 142. The integrated image search system 100 also includes a content platform component 150 having an image search server operations component 152. The components of the integrated image search system 100 may communicate with each other over one or more networks (e.g., public network or virtual private network "VPN"). The network (not shown) may include, without limitation, one or more local area networks (LANs) and/or wide area networks (WANs). The mobile device 110 can be a client computing device that corresponds to the computing device described herein with reference to FIG. 7.

The components of the integrated image search system 100 can operate together to provide functionality for integrated image searching described herein. The integrated image search system 100 supports an image search feature of the content application 140 on a computing device (e.g., mobile device 110). The content application 140 can include a content application component (not shown) that supports launching the content application 140 to run on the mobile device. Content application 140 can be an e-commerce application for processing online retail transactions, for instance, buying and selling products. The content application can be the eBay mobile app, developed by eBAY INC., to operate with a corresponding content platform (e.g., content platform component 150). A content platform (e.g., e-commerce platform) can facilitate consumer-to-consumer and business-to-consumer online sales. A content platform can specifically support image searching for identifying products in the content platform catalog of products. Image searching (also known as search by image or reverse image search) can refer to searching based on an image, not keywords, to find the exact same image, or substantially similar images, of an image as image search results. The content application 140 provides for image searching using the image search operations component 142.

The image search operations component 142 is configured to perform different types of operations to provide integrated image searching functionality. The image search operations component 142 receives, via a native operating system action, an image identifier to execute an image search operation. The native operating system can be a mobile operating system (e.g., ANDROID developed by GOOGLE INC. or iOS developed APPLE INC.) that supports mobile devices. The native operating system is developed using a plurality of application programming interfaces (APIs) that include sets of subroutine definitions, protocols and tools. The APIs can also be used to build integrated custom actions that are entry points to the image search feature of the content application. The native operating system action is an integrated custom action that defines an entry point to the image search feature of the content application.

In embodiments described herein, the image search feature that operates based in part on the integration of the image search feature with a native operating system, such that, integrated custom actions can be used to launch the image search feature from external applications. The mobile device 100 runs the content application 140 and also other external applications (e.g., photo application 132 and browser application 134) using native operation system components 120. In this regard, an external application can communicate with the content application 140. In particular, while in an external application, the native operating system components 120 support receiving an indication to launch the native operating system integrated custom action interfaces and generating a native operating system integrated custom action interface in the external application. The native operating system components 120 receive an indication to execute an action via the integrated custom action interface. As discussed in more detail below, the integrated custom action interface can be associated with an image or URL in the external application.

The image search operations component 142 operates with the following integrated custom actions that define entry points to the image search feature: a share image action of the native operating system that allows sharing an image to execute the image search, a share URL action of the native operating system that allows sharing a URL to execute the image search, a copy share URL action of the native operating system, where a clipboard manager is queried to identify image identifiers to execute the image search, and a drag and drop action of the native operating system that is used identify an image dragged and dropped to execute the image search. The integrated custom actions can be associated with corresponding action interfaces that generate the actions as selectable options.

The image search operations component 142 further supports generating additional interfaces for functionality supported within the content application 140 for image searching. For example, the image search operations component 142 supports generating a graphic edit tool interface that displays a prompt to crop the image. The image search operations component 142 can also operate with an extract thumbnail service to extract at least thumbnail representation of the image based on a URL identified from the share URL action. The image search operations component 142 further automatically detects an image identifier on a clipboard manager, where the image identifier is a Uniform Resource Locator (URL) received based on the copy share URL action of the native operating system of the mobile device and then generates an image search prompt interface. The image search prompt interface is generated without user intervention and can include a thumbnail representation of an image associated with the image identifier and a selectable option to not execute the image search operation. The image search operations component 142 can receive an indication through the image search prompt interface to execute the image search operation. The integrated custom actions can further be associated with corresponding graphical user interfaces that are discussed in more detail below and further with reference to FIGS. 2, 3 and 4.

The image search operations component 142 communicates with the content platform component 150 to perform a search based on an image or image identifier. The image search operations component 142 communicates the image identifier or the image to the image search server operations component 152. The image search server operations component 152 receives the image or the image identifier and uses the corresponding image to identify the image search results. The image search server operations component 152 can include or have access to an image store storing images for a collection of products associated with the content platform. The image search server operations component 152 communicates the image search results to the content application 140. The image search operations component 142 can receive the image search results and cause display of an image search results page having the image search results. The image search operations component 142 may cause display of an image search results page that is displayed using an interface of the content application 140. In the alternative, the image search operations component 142 can cause display of an image search results page that is displayed via an interface of an external application (e.g., browser application 134) from which the selection of the image was made. In this regard, the user is returned to the original context from which the image 312 was identified. In one implementation, the image search results page is displayed in combination with a link that operates as an entry point to an external application. The link can include thumbnail representation of the image, where the thumbnail representation of the image is displayed in an image search input bar.

Figure 2:
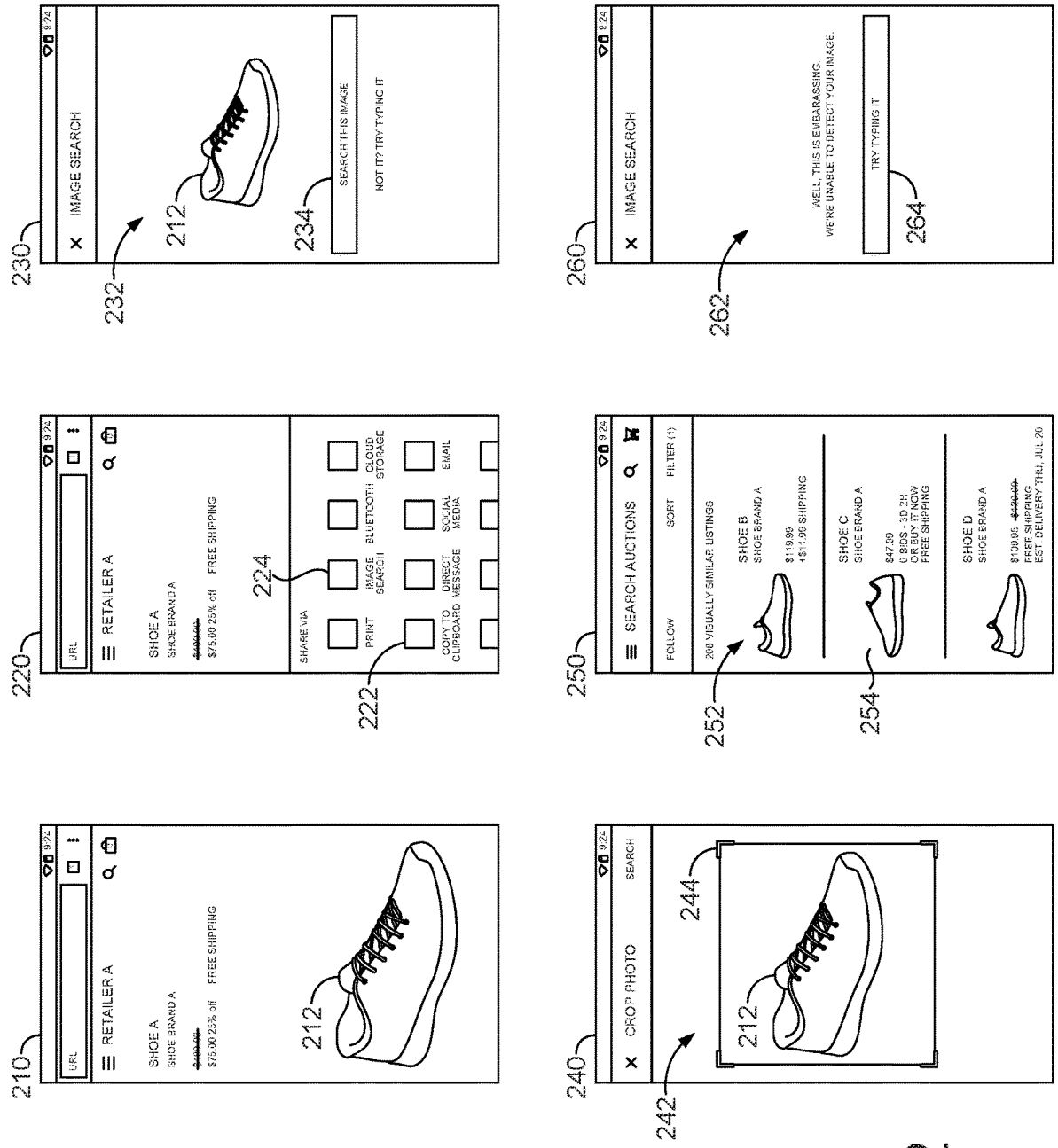
FIG. 2 includes illustrations of exemplary interfaces for implementing an integrated image search system, in accordance with embodiments described herein.
Figure 3:
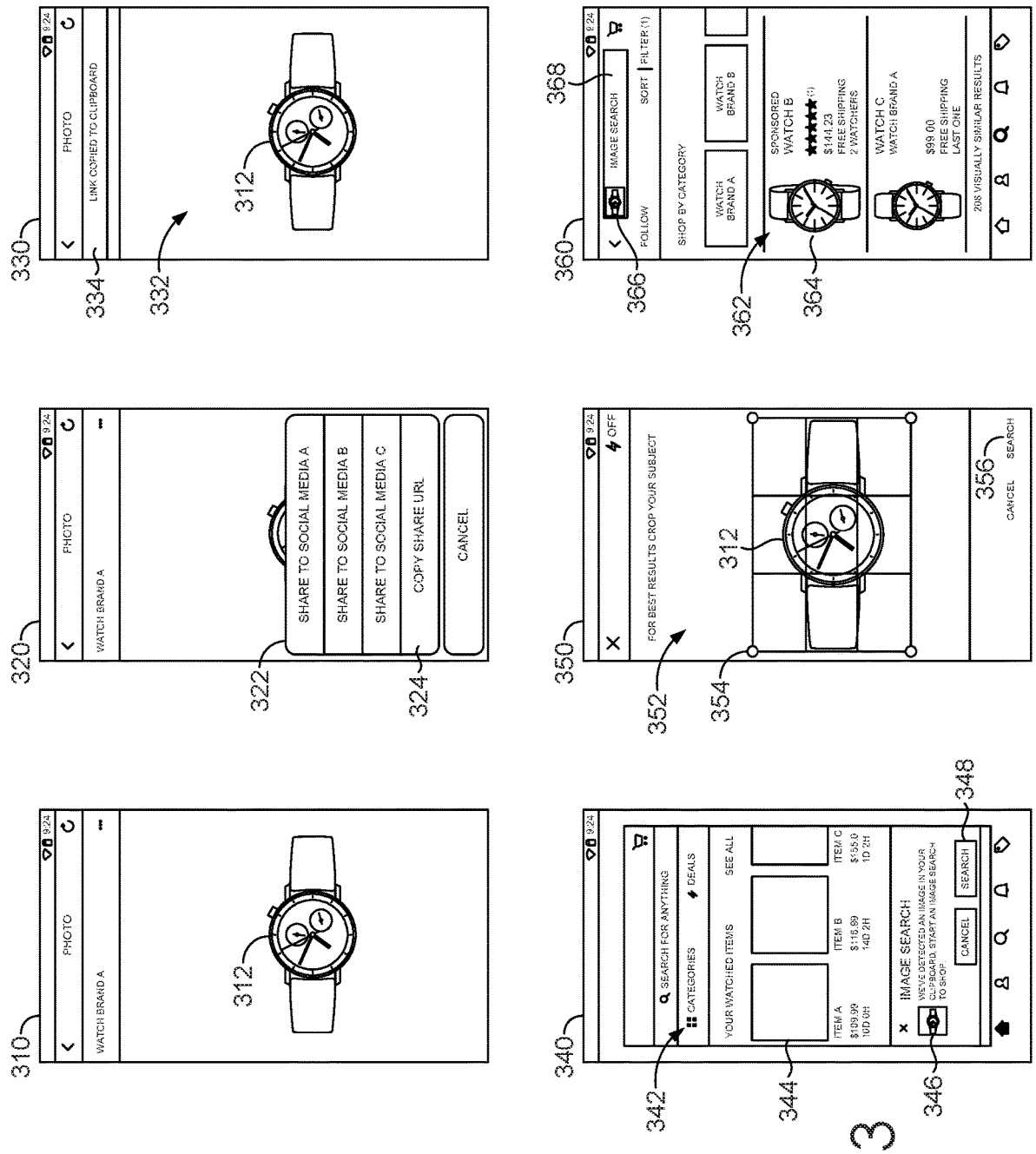
FIG. 3 includes illustrations of exemplary interfaces for implementing an integrated image search system, in accordance with embodiments described herein.
Figure 4:
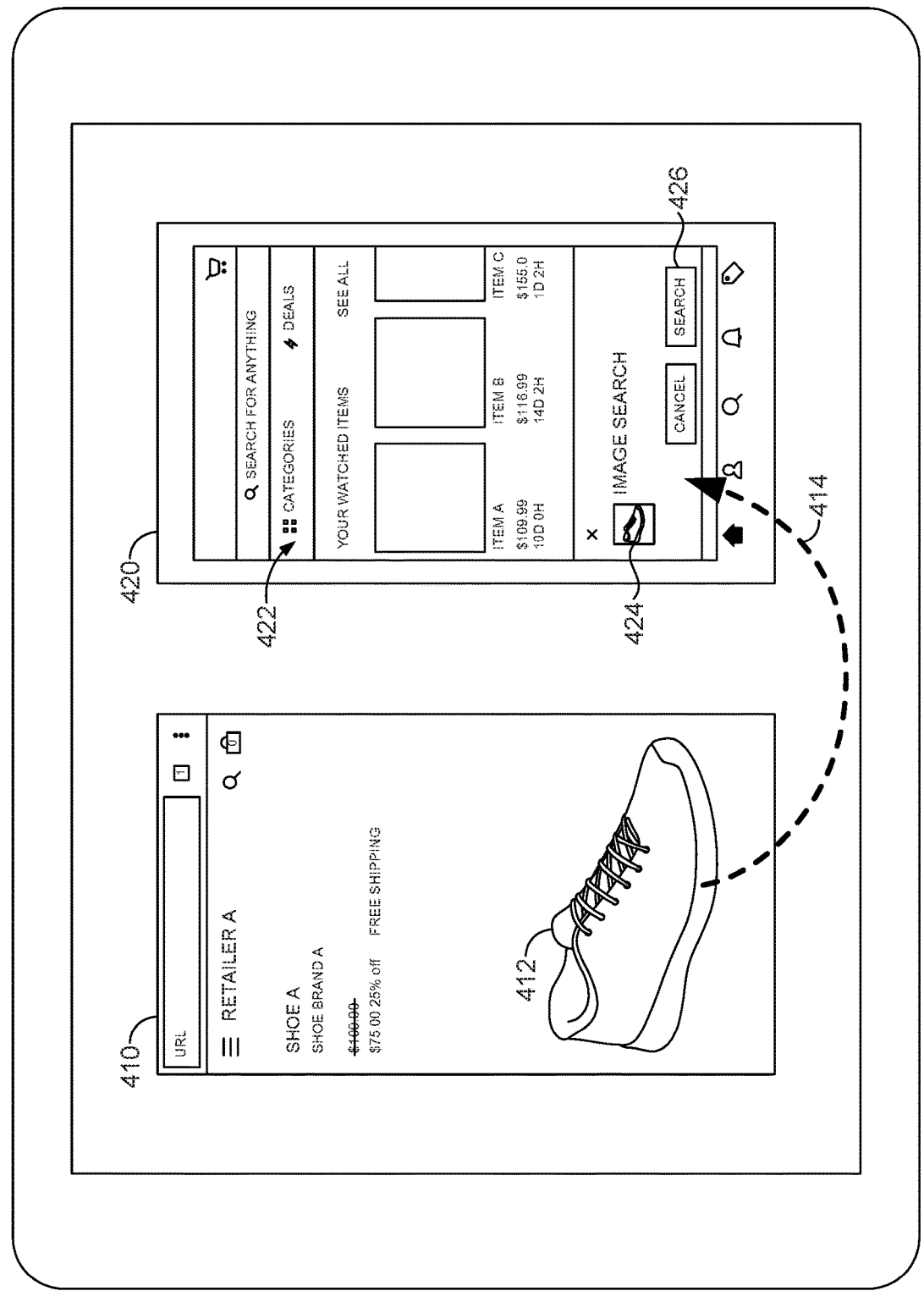
FIG. 4 is an illustration of an exemplary interface for implementing an integrated image search system, in accordance with embodiments described herein.

FIGS. 2, 3 and 4 include several illustrations of graphical user interfaces (GUI) that support the functionality of the integrated image search system. With reference to the share image action, a user may browse content online in an external application (e.g., browser application 134), as shown in GUI 210. The external application supports, using the native operating system, direct to application sharing. While browsing, the user can come across an image 212 of a product the user would like to purchase. The user can initiate the share image action using a defined selection input (e.g., long press, menu selection, or other predefined gesture). For example, the user can perform a long press on the image 212 to bring up the share image action interface 222 as shown in GUI 220. The share image action interface 222 includes a share image action icon 224 that operates as an entry point to the content application to execute the image searching feature. The user can select the share image action icon 224 to launch the content application.

The content application can be launched into an image search landing page 232 (i.e., image search prompt interface) as shown in GUI 230. The image search landing page 232 includes the image 212. The image search landing page 232 can also include other prompts and functionality. For example, a search this image prompt 234 can be generated to let the user determine whether an image search operation should be performed for the image 212 on display on the image search landing page 232. If the image 212 is incorrect, the user can opt to conduct a standard keyword search. Upon receiving an indication through the image search landing page 232 to execute the image search operation, a graphic edit tool interface 242 that displays a prompt 244 to crop the image, as shown in GUI 240, can be generated. The user can crop the image 212 and enter a selection input (e.g., search 246) to execute the image search operation.

The GUI 250 illustrates an image search results page 252. The image search results page can include image search results 254 identified for the image 212. GUI 260 illustrates a no matches found landing page 262 that is generated when no matching images are identified. The no matches found landing page 262 can also include other prompts and functionality. For example, keyword search prompt 264 can be generated to let the user determine whether a keyword search operation should be performed.

The share URL action interface (not shown) can be generated when a user browsing content online in an external application (e.g., browser application 134). The external application supports, through the native operating system, URL sharing. While browsing, the user can come across an image of a product the user would like to purchase. The user can initiate the share URL action using a defined selection input. The URL is shared with the content application in order to perform an image search operation. In particular, an extract thumbnail service can be used to extract a thumbnail representation of the image or the image based on the URL. For example, the open graph protocol supports open graph image tags that can be used to extract a thumbnail of the image.

Turning to FIG. 3, illustrating the copy share URL action, a user may browse content online in an external application (e.g., photo application 132), as shown in GUI 310. The external application may not support direct to application sharing via the native operating system for all applications. While browsing, the user can come across an image 312 of a product the user would like to purchase. The user can initiate the copy share URL action using a defined selection input (e.g., long press, menu selection, or other predefined gesture). For example, the user can perform a long press on the image 312 to bring up the copy share URL interface 322 as shown in GUI 320. The share image action interface 322 includes a copy share URL icon 324 that operates, at least partially, as an entry point to the content application to execute the image searching feature. The GUI 330 can present a copy confirmation page 332 that displays that image 312 and also a message 334 indicating that the link has been copied to the clipboard (i.e., clipboard manager). The copy confirmation page 332 can be a feature triggered by the specific external application the user is operating. The user may close out of the external application.

The content application can be launched into a landing page 342 as shown in GUI 340. The landing page 342 includes watched items 344 or other previous shopping history of the user. Upon launching, the content application can automatically detect an image identifier from a clipboard manager. The image identifier is a Uniform Resource Locator (URL) received based on the copy share URL action of the native operating system of the mobile device. The landing page 342 in particular can include an image search prompt interface 346 that is automatically generated without user intervention based on detecting the image identifier on the clipboard manager. The image search prompt interface 346 can be generated to let the user determine whether an image search operation should be performed for the image 312. The image search prompt interface 346 may be generated with a thumbnail representation of an image associated with the image identifier and a selectable option to not execute the image search operation. The user can enter a selection input (e.g., search 348) to execute the image search operation. As shown in GUI 350, upon receiving an indication to perform the image search operation, a graphic edit tool interface 352 that displays a crop prompt 354 to crop the image is generated. The user can crop the image 312 and enter a selection input (e.g., search 356) to execute the image search operation.

The GUI 360 illustrates an image search results page 362. The image search results page can include image search results 364 identified for the image. The image search results page 362 may be displayed in combination with a link 366 that operates as an entry point to an external application. The link comprises a thumbnail representation of the image, where the thumbnail representation of the image is displayed in an image search input bar 368.

Turning to FIG. 4, illustrating the drag and drop action, a user may browse content online in an external application (e.g., photo application 132 or browser application 134), as shown in GUI 410 having the content application open to the external application, as shown in GUI 420. The external application may support, through the native operating system, drag and drop sharing for applications. While browsing, the user can come across an image 412 of a product the user would like to purchase. The user can initiate a drag and drop action 414 using a defined drag and drop input gesture. The content application, as shown in GUI 420 on a drag and drop landing page 422, recognizes the drag and drop action, and then performs the image search using the image that was identified using the drag and drop pointing gesture. The drag and drop landing page 422 also include other prompts and functionality. For example, a search this image prompt 424 can be generated to let the user determine whether an image search operation should be performed for the image 412. If the image 412 is incorrect, the user can opt to conduct a standard keyword search. Upon receiving an indication (e.g., search 426) through the drag and drop landing page 422 to execute the image search operation, a graphic edit tool interface (not shown) can display a prompt to crop the image. The user can crop the image 212 and enter a selection input to execute the image search operation.

Figure 5:
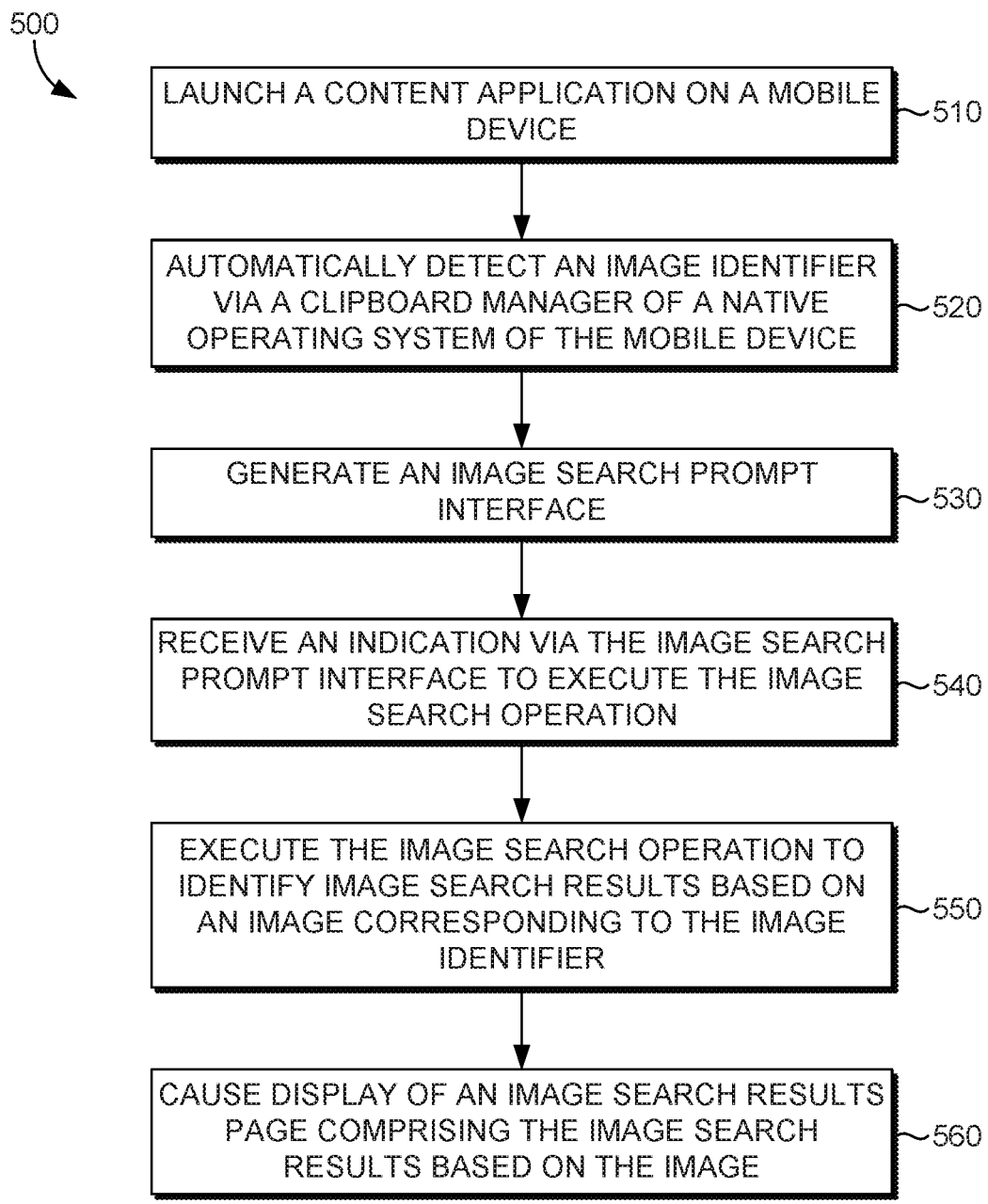
FIG. 5 is a flow diagram showing an exemplary method for implementing an integrated image search system, in accordance with embodiments described herein.
Figure 6A:
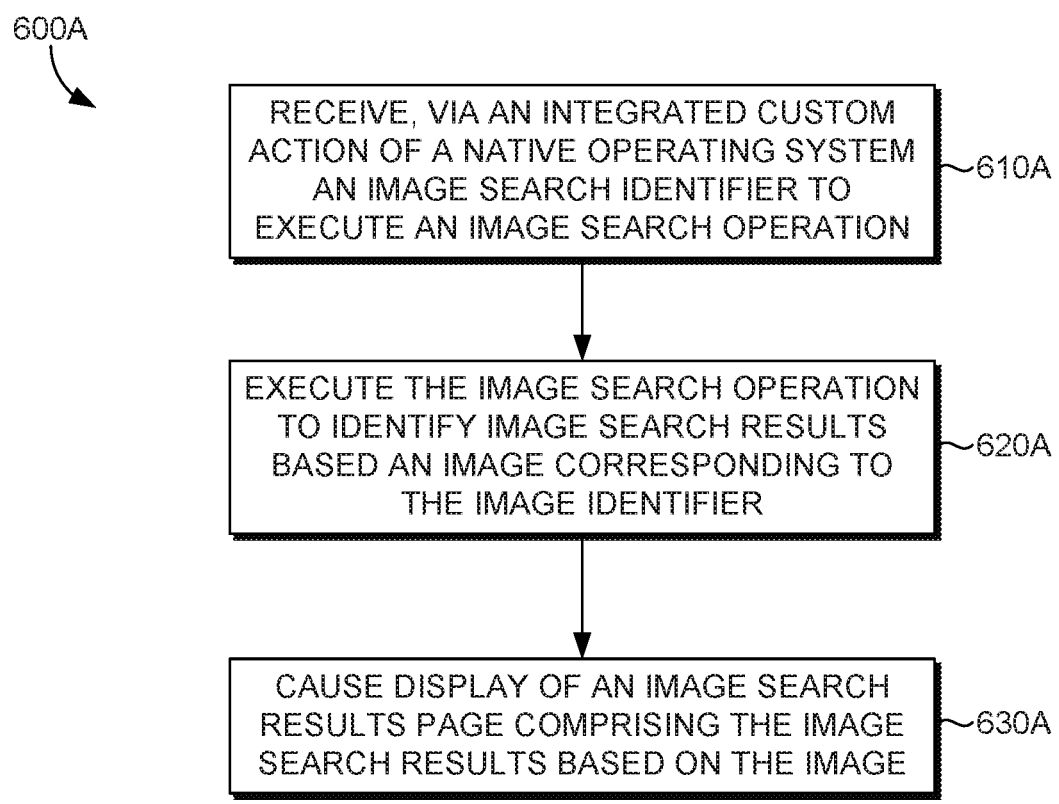
FIG. 6A is a flow diagram showing an exemplary method for implementing an integrated image search system, in accordance with embodiments described herein.
Figure 6B:
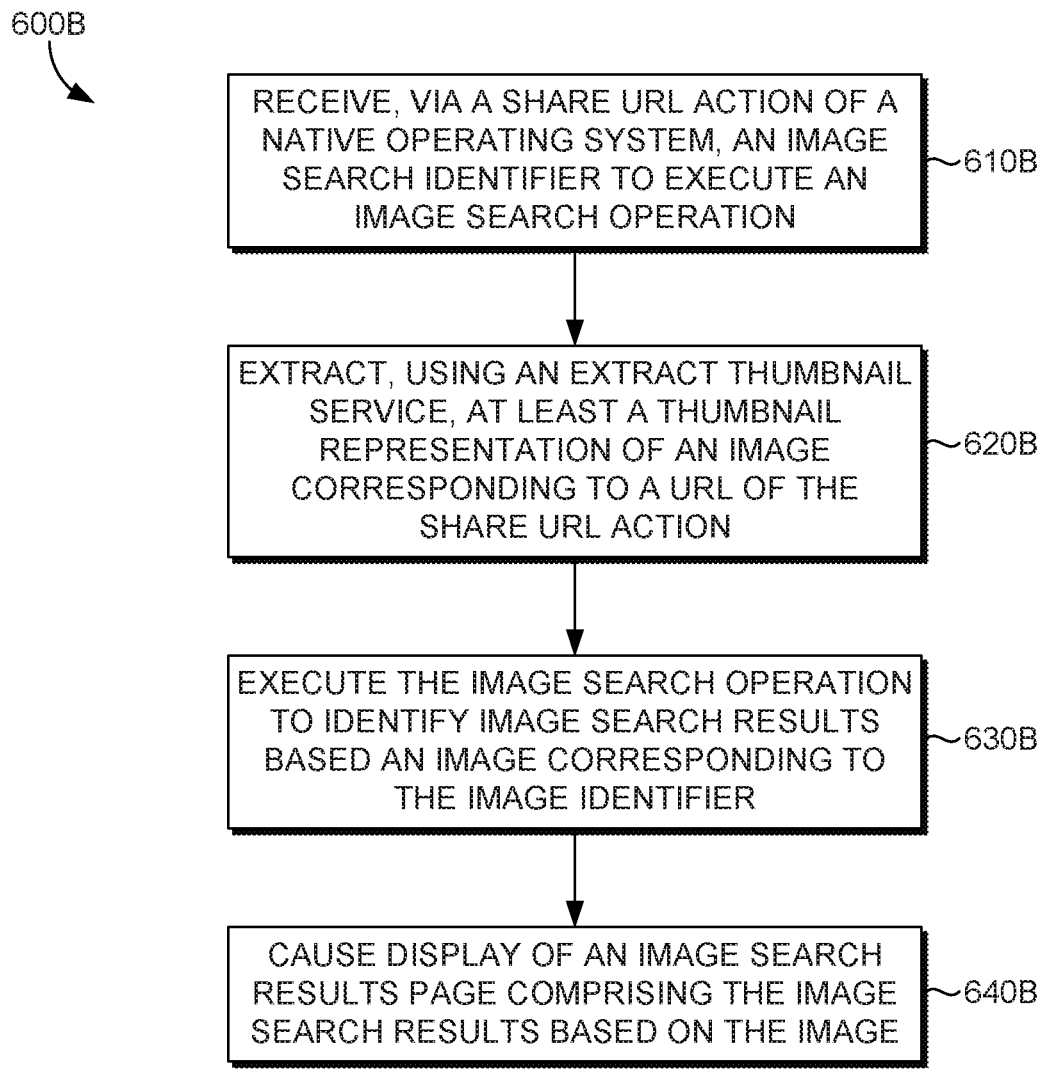
FIG. 6B is a flow diagram showing an exemplary method for implementing an integrated image search system, in accordance with embodiments described herein.

With reference to FIGS. 5, 6A and 6B, flow diagrams are provided illustrating methods for implementing an integrated image search system. The methods can be performed using the integrated image search system described herein. In embodiments, one or more computer storage media having computer-executable instructions embodied thereon that, when executed, by one or more processors, can cause the one or more processors to perform the methods in the integrated image search system.

Turning to FIG. 5, a flow diagram is provided that illustrates a method 500 for implementing an integrated image search system. Initially at block 510, a content application is launched on a mobile device. The content application comprises an image search feature for searching for images. At block 520, an image identifier is automatically detected from a clipboard manager of a native operating system of the mobile device. The image identifier is a URL received based on a copy share URL action of the native operating system of the mobile device. The copy share URL action is a custom action that defines an entry point to the image search feature. In addition, the image identifier is received based on receiving, at an external application, an indication to launch a native operating system copy share URL action interface, generating the native operating system copy share URL action interface in the external application; and receiving an indication to copy share a URL associated with an image in the external application. The URL is stored in association with the clipboard manager.

At block 530, an image search prompt interface is generated. The image search prompt interface displays a prompt to execute an image search operation. At block 540, an indication is received via the image search prompt interface to execute the image search operation. At block 550, the image search operation is executed to identify image search results based on an image corresponding to the image identifier. The image search operation is executed based on an image store for a plurality of products associated with a content platform of the content application. At block 560, an image search results page comprising the image search results based on the image is caused to be displayed.

Turning to FIG. 6A, a flow diagram is provided that illustrates a method 600A for implementing an integrated image search system. Initially at step 610A, an image identifier to execute an image search operation is received via an integrated custom action of a native operating system. The image identifier is received on a content application running on a mobile device. The native operating system is a mobile operating system that supports a plurality of application programming interfaces (APIs), the APIs are used to build integrated custom actions that are entry points to the image search feature of the content application.

The integrated custom actions that define entry points include the following: a share image action of the native operating system that allows sharing an image to execute the image search, a share URL action of the native operating system that allows sharing a URL to execute the image search, a copy share URL action of the native operating system, wherein a clipboard manager is queried to identify image identifiers to execute the image search, and a drag and drop action of the native operating system that is used identify an image dragged and dropped to execute the image search.

At block 620A, the image search operation is executed to identify image search results based on an image corresponding to the image identifier. The image search operation is executed based on an image store for a plurality of products associated with a content platform of the content application. At block 630A, an image search results page comprising the image search results based on the image is caused to be displayed.

Turning to FIG. 6B, a flow diagram is provided that illustrates a method 600B for implementing an integrated image search system. Initially at step 610B, an image identifier to execute an image search operation is received via a share URL action of a native operating system. The image identifier is received on a content application running on a mobile device. The native operating system is a mobile operating system that supports a plurality of application programming interfaces (APIs), the APIs are used to build integrated custom actions that are entry points to the image search feature of the content application.

At block 620B, at least a thumbnail representation of an image corresponding to a URL of the share URL action is extracted using an extract thumbnail service. The extract thumbnail service may, in the alternative or in addition, extract the image itself. The extract thumbnail service can specifically be the open graph protocol that supports open graph image tags that can be used to extract a thumbnail of the image.

At block 630B, the image search operation is executed to identify image search results based on an image corresponding to the image identifier. The image search operation is executed based on an image store for a plurality of products associated with a content platform of the content application. At block 640B, an image search results page comprising the image search results based on the image is caused to be displayed.

With reference to the integrated image search system 100, embodiments described herein support an image search feature of a content application on a mobile device. The content application includes the image search feature that operates based in part on the integration of the image search feature with a native operating system of the mobile device. The integrated image search system components refer to integrated components that implement the image search system. The integrated components refer to the hardware architecture and software framework that support functionality using the integrated image search system components. The hardware architecture refers to physical components and interrelationships thereof and the software framework refers to software providing functionality that can be implemented with hardware operated on a device. The end-to-end software-based integrated image search system can operate within the other components to operate computer hardware to provide integrated image search system functionality. As such, the integrated image search system components can manage resources and provide services for the integrated image search system functionality. Any other variations and combinations thereof are contemplated with embodiments of the present invention.

By way of example, the integrated image search system can include an API library that includes specifications for routines, data structures, object classes, and variables may support the interaction the hardware architecture of the device and the software framework of the integrated image search system. These APIs include configuration specifications for the integrated image search system such that the components therein can communicate with each other for image searching, as described herein.

Having identified various component of the integrated image search system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The integrated image search system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 7:
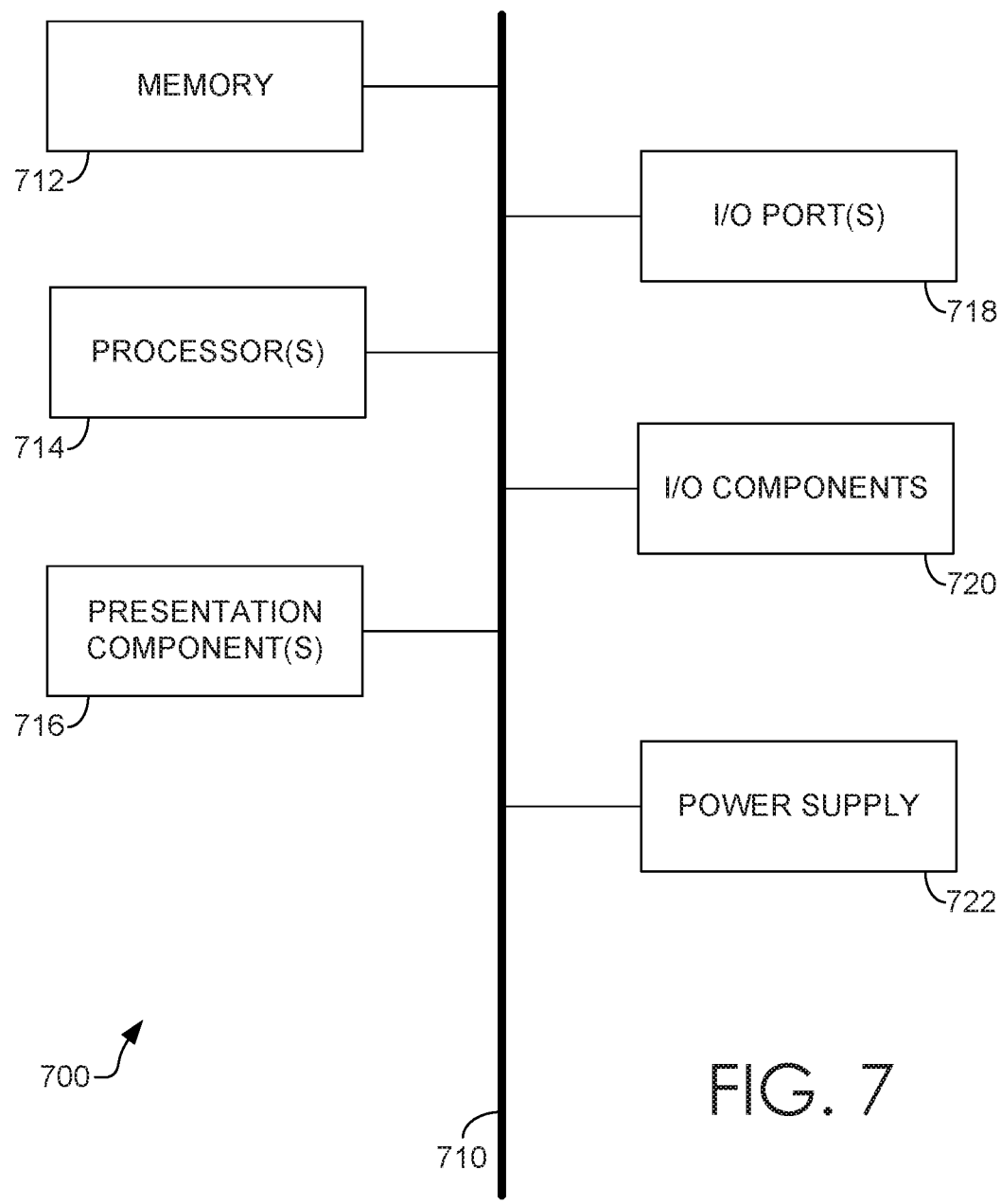
FIG. 7 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types.

The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the distributed data object management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media having computer-executable instructions embodied thereon that, when executed, by one or more processors, cause the one or more processors to perform a method for providing integrated image searching, the method comprising:

accessing input associated with a first integrated custom action, when the first integrated custom action is triggered via a native operating system and a first external application of a set of external applications, wherein the native operating system supports a set of integrated custom actions that trigger image search operations and e-commerce operations on a content application from the set of external applications;

in response to the first integrated custom action triggered via the native operating system, launching the content application on a mobile device, the content application is a mobile device e-commerce application of a content platform for processing online retail transactions for buying and selling a plurality of products, wherein the content application comprises an image search feature for searching for images, wherein the content application is integrated with the native operating system to generate the set of integrated custom actions that define corresponding entry points, in a set of entry points, to directly launch the image search feature on a landing page of the content application, the set of integrated custom actions comprising the first integrated custom action associated with a first image search interface for a first external application and a second integrated custom action associated with a second image search interface for a second external application that is different from the first external application;

receiving, via the first integrated custom action from the set of integrated customer actions of the native operating system, an image identifier to execute an image search operation of the image search feature, the first integrated custom action defines an entry point to the content application based on the content application automatically detecting the image identifier from a clipboard manager, wherein the image identifier is a Uniform Resource Locator (URL) received based on a copy share URL action of the native operating system of the mobile device, wherein the copy share URL action is the first integrated custom action;

generating, in the content application, an image search prompt interface associated with the first image search interface, wherein the image search prompt interface displays a prompt to execute the image search operation;

receiving, in the content application, an indication via the image search prompt interface to execute the image search operation;

executing the image search operation to identify image search results based on an image corresponding to the image identifier, wherein the image search operation is executed based on an image store for the plurality of products associated with the content platform of the content application;

causing display of an image search results page comprising the image search results based on the image; and receiving, in the content application, a user input to execute an e-commerce operation to process an online retail transaction that corresponds to an image search result from the image search results generated in part based on the native operating system and the first integrated custom action.

2. The media of claim 1, wherein the native operating system is a mobile operating system having a plurality of application programming interfaces (APIs), wherein the APIs are used to build integrated custom actions that are entry points to the image search feature of the content application, wherein the content application is programmed to access the clipboard manager storing the image identifier.

3. The media of claim 1, wherein the image identifier is received based on:
   receiving, at the first external application, an indication to launch the native operating system copy share URL action interface;
   generating the native operating system copy share URL action interface in the first external application; and
   receiving an indication to copy share a URL associated with an image in the first external application, wherein the URL is stored in association with the clipboard manager.

4. The media of claim 1, wherein the image search prompt interface is generated at the content application without user intervention, the image prompt interface comprises a thumbnail representation of an image associated with the image identifier and a selectable option to not execute the image search operation.

5. The media of claim 1, wherein upon receiving the indication via the image search prompt interface to execute the image search operation, the method further comprises generating a graphic edit tool interface of the content application that displays a prompt to crop the image within the content application.

6. The media of claim 1, wherein the image search results page is displayed in combination with a link that operates as an entry point to an external application, wherein the link comprises a thumbnail representation of the image.

7. An integrated image search system, the system comprising:
   one or more processors; and
   one or more computer storage media storing computer-useable instructions that, when used by the one or more processors, cause the one or more processors to:
   access input associated with a first integrated custom action, when the first integrated custom action is triggered via a native operating system and a first external application of a set of external applications,
   wherein the native operating system supports a set of integrated custom action that trigger image search operation and e-commerce operations on a content application from the set of external applications;
   in response to the first integrated custom action triggered via the native operating system, launch the content application on a mobile device, the content application is a mobile device e-commerce application of a content platform for processing online retail transactions for buying and selling a plurality of products, wherein the content application comprises an image search feature for searching for images,
   wherein the content application is integrated with the native operating system to generate the set of integrated custom actions that define corresponding entry points, in a set of entry points, to directly launch the image search feature on a landing page of the content application,
   the set of integrated custom actions comprising the first integrated custom action associated with a first image search interface for a first external application and a second integrated custom action associated with a second image search interface for a second external application that is different from the first external application;
   receive, via the first integrated custom action from the set of integrated custom actions of the native operating system, an image identifier to execute an image search operation of the image search feature;
   generate, in the content application, an image search prompt interface associated with the first image search interface, wherein the image search prompt interface displays a prompt to execute the image search operation;
   receive, in the content application, an indication via the image search prompt interface to execute the image search operation;
   execute the image search operation to identify image search results based on an image corresponding to the image identifier, wherein the image search operation is executed based on an image store for a plurality of products associated with the content platform of the content application;
   cause display of an image search results page comprising the image search results based on the image; and
   receive, in the content application, a user input to execute an e-commerce operation to process an online retail transaction that corresponds to an image search result from the image search results generated in part based on the native operating system and the first integrated custom action.

8. The system of claim 7, wherein the native operating system is a mobile operating system that supports a plurality of application programming interfaces (APIs), wherein the APIs are used to build integrated custom actions that are entry points to the image search feature of the content application.

9. The system of claim 7, wherein the set of integrated custom actions that define the entry points include each the following:
   a share image action of the native operating system that allows sharing an image to execute the image search;
   a share URL action of the native operating system that allows sharing a URL to execute the image search;
   a copy share URL action of the native operating system, wherein a clipboard manager is queried to identify image identifiers to execute the image search; and
   a drag and drop action of the native operating system that is used identify an image dragged and dropped to execute the image search.

10. The system of claim 9, wherein the share URL action operates with an extract thumbnail service to extract at least a thumbnail representation of the image based on a URL identified from the share URL action.

11. The system of claim 9, wherein the content application is further configured to:
   automatically detect an image identifier from a clipboard manager, wherein the image identifier is a Uniform Resource Locator (URL) received based on the copy share URL action of the native operating system;

generate the image search prompt interface, wherein image search prompt interface prompts the user to execute the image search operation, wherein the image search prompt interface is generated at the content application without user intervention, the image prompt interface comprises a thumbnail representation of an image associated with the image identifier and a selectable option to not execute the image search operation;

receive the indication via the image search prompt interface to execute the image search operation; and generate a graphic edit tool interface of the content application that displays a prompt to crop the image corresponding to the image identifier within the content application.

12. The system of claim 10, further comprising a content platform configured to:

receive the image or image identifier from the content application;

identify the image search results from the image store for the plurality of products associated with the content platform; and communicate the image search results to the content application.

13. The system of claim 7, wherein the content application is further configured to:

cause display of the image search results page comprising the image search results based on the image, wherein the image search results page is displayed via an interface of the content application; and cause display of the image search results page comprising the image search results based on the image, wherein the image search results page is displayed via an interface of an external application.

14. The system of claim 7, wherein the image search results page is displayed in combination with a link that operates as an entry point to an external application, wherein the link comprises a thumbnail representation of the image, wherein the thumbnail representation of the image is displayed in an image search input bar.

15. A computer-implemented method for providing integrated image searching, the method comprising:

accessing input associated with a first integrated custom action, when the first integrated custom action is triggered via a native operating system and a first external application of a set of external applications, wherein the native operating system supports a set of integrated custom action that trigger image search operations and e-commerce operations on a context application from the set of external applications;

in response to the first integrated custom action triggered via the native operating system, launching the content application on a mobile device, the content application is a mobile device e-commerce application of a content platform for processing online retail transactions for buying and selling a plurality of products, wherein the content application comprises an image search feature for searching for images, wherein the content application is integrated with the native operating system to generate the set of integrated custom actions that define corresponding entry points, in a set of entry points, to directly launch the image search feature on a landing page of the context application, the set of integrated custom actions comprising the first integrated custom action associated with a first image search interface for a first external application and a second integrated custom action associated with a second image search interface for a second external application that is different from the first external application;

receiving, via the first integrated custom action from the set of integrated custom actions of the native operating system, an image identifier to execute an image search operation of the image search feature;

generating, in the content application, an image search prompt interface associated with the first image search interface, wherein the image search prompt interface displays a prompt to execute the image search operation;

receiving, in the content application, an indication via the image search prompt interface to execute the image search operation;

executing the image search operation identify image search results based on an image corresponding to the image identifier, wherein the image search operation is executed based on an image store for a plurality of products associated with the content platform of the content application;

causing display of an image search results page comprising the image search results based on the image; and receiving, in the content application, a user input to execute an e-commerce operation to process an online retail transaction that corresponds to an image search result from the image search results generated in part based on the native operating system and the first integrated custom action.

16. The method of claim 15, wherein the image identifier is received based on:

receiving, at the first external application, an indication to launch the native operating system integrated custom action interface;

generating the native operating system integrated custom action interface in the first external application; and receiving an indication to execute an action using the native operating system integrated custom action interface associated with an image or URL in the first external application.

17. The method of claim 15, wherein the first integrated custom action is a share image action of the native operating system that allows sharing the image identifier as an image to execute the image search operation.

18. The method of claim 15, wherein the first integrated custom action is a share URL action of the native operating system that allows sharing a URL to execute the image search, wherein the share URL action operates with an extract thumbnail service to extract at least a thumbnail image that represents the image based on a URL identified from the share URL action.

19. The method of claim 15, wherein the first integrated custom action is a drag and drop action of the native operating system that is used identify an image dragged and dropped to execute the image search, wherein upon receiving the image, the method further comprises generating a graphic edit tool interface that displays a prompt to crop the image.

20. The method of claim 15, wherein executing the image search operation identify image search results further comprises:

communicating the image identifier or the image to a content platform; and receiving the image search results identified from the image store for the plurality of products associated with the content platform.

\* \* \* \* \*